May 19, 1925.
C. GIRL
BUMPER
Filed July 23, 1923
1,538,183
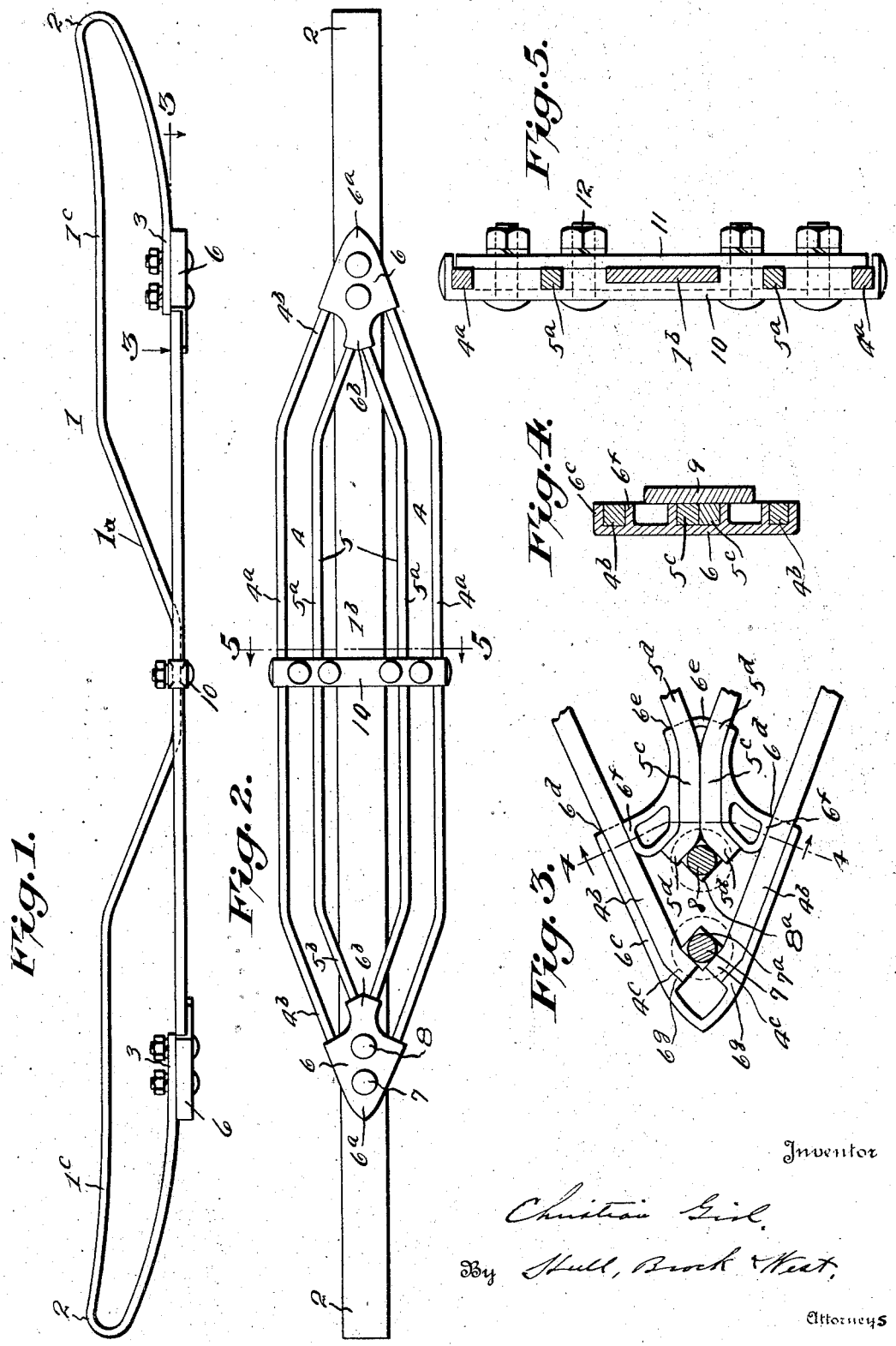

Patented May 19, 1925.

1,538,183

UNITED STATES PATENT OFFICE.

CHRISTIAN GIRL, OF KALAMAZOO, MICHIGAN, ASSIGNOR TO THE C. G. SPRING & BUMPER COMPANY, OF DETROIT, MICHIGAN, A CORPORATION OF DELAWARE.

BUMPER.

Application filed July 23, 1923. Serial No. 653,144.

*To all whom it may concern:*

Be it known that I, CHRISTIAN GIRL, a citizen of the United States, residing at Kalamazoo, in the county of Kalamazoo and State of Michigan, have invented a certain new and useful Improvement in Bumpers, of which the following is a full, clear, and exact description, reference being had to the accompanying drawings.

This invention relates to bumpers for automobiles and like vehicles and has for its general object to provide a novel and effective construction for bumpers which will enable the latter to receive and withstand all ordinary blows or shocks to which such bumpers are liable. A further object of the invention is to produce a bumper of this kind which is attractive in appearance and relatively cheap to produce. Further and more limited objects of the invention will appear in the descriptive part of this specification and will be realized by the combinations of elements embodied in the claims.

In the drawings forming a part thereof, Fig. 1 represents a plan view of a bumper constructed in accordance with my invention; Fig. 2 a front elevation of the bumper shown in Fig. 1; Fig. 3 a detail in section corresponding to the line 3—3 of Fig. 1; and Figs. 4 and 5 sectional details corresponding respectively to the line 4—4 and 5—5 of Figs. 3 and 2, respectively.

Describing the various parts by reference characters, 1 denotes generally a rear or auxiliary section of my bumper, the said section comprising a bar, preferably a continuous spring plate, having its central portion projected forwardly in a flattened V-shape, as shown at $1^a$ and $1^b$, the end portions of the plate being bent into loops 2, the front ends 3 of the plate projecting toward each other but spaced apart. On opposite sides of the central portion, the bar 1 is provided with transversely extending portions $1^c$ each constituting a member for receiving a clip or other means for attaching the bumper to the side members (not shown).

The front ends of this rear or auxiliary bar or plate support the opposite ends of a widened impact-receiving section. This impact-receiving section consists generally of a plurality of vertically spaced bars, four such bars being shown, preferably square in section, and forming, when assembled, a long substantially oval impact section. The external top and bottom bars 4 are substantially identical in construction, but are oppositely placed so that the upwardly projected portion of the upper bar is opposed to a corresponding downwardly projected portion of the lower bar, these central projected portions $4^a$ being parallel to each other and to the bar 1. Each of these bars is provided with portions $4^b$ which project from the central portion $4^a$ toward the similarly inclined portions $4^b$ of the other bar. The extreme end portions $4^c$ of each of these bars are still further deflected toward the corresponding ends of the other bar.

Within the uppermost and lowermost bars 4 are located the intermediate bars 5. Each of these bars extends substantially parallel throughout its length with the bar 4 above and below the same, respectively, each having a central portion $5^a$ parallel with the portions $4^a$; also portions $5^b$ parallel with the portions $4^b$ of the corresponding bar 4 adjacent thereto; contacting portions $5^c$ engaging each other at the longitudinal axis of the bumper; and outwardly diverging extreme end portions $5^d$.

In order to anchor the bars 4 and 5 to the ends 3 of the rear or auxiliary bar, the following construction is provided:—

6 denotes a pair of outer or front clamping plates each having an outer end $6^a$, the sides whereof converge toward each other, and a narrow inwardly expanded rear end $6^b$. Each plate 6 is provided with a marginal flange $6^c$ extending therearound, but provided with slots $6^d$ and $6^e$ for the reception of the parts $4^b$ of the bars 4 and the parts $5^b$ of the bars 5. The flange at the inner portion of each plate is widened, as shown at $6^f$, to provide an extended seat for the lower surface of the part $4^b$ of the upper bar 4 and for the upper surface of the part $4^b$ of the lower bar 4. The upper and lower surfaces of the parts $4^b$ of said bars, respectively, bear against the upper and the lower tapered parts of the flange $6^c$. This flange is deflected inwardly, as shown at $6^g$, to provide seats for the upper and lower surfaces of the parts $4^c$, and the opposite surfaces of such parts are engaged by the adjacent sides of the squared portion $7^a$ of a clamping bolt 7.

The flange $6^c$ is also extended inwardly from the slots $6^e$, thereby to provide extended bearings for the upper surfaces of the parts 5ᶜ and 5ᵈ of the upper bar 5 and for the lower surfaces of the same parts of the lower bar 5. The divergent ends 5ᵈ are held in engagement with their cooperating seats by means of the adjacent sides of the squared portion 8ᵃ of a bolt 8, the bolts 7 and 8 serving jointly to secure a cover plate 9 to the clamping plate 6 and both plates to the ends 3 of the bar 1.

The central portion 1ᵇ of the rear auxiliary plate 1 is deflected forwardly a sufficient distance to align it with the bars 4 and 5, whereby the central portion of said plate and the central portions of said bars may be conveniently clamped together and the rear bar serve as a truss for the front or impact section. The clamp is shown in detail (Figs. 1, 2 and 5), and comprises a front plate 10 having recessed seats projecting forwardly from the rear face thereof for the parts 4ᵃ, 5ᵃ and 1ᵇ, with a rear plate 11 clamped to the front plate by means of bolts 12 located between the bars 4ᵃ and 5ᵃ and between the last mentioned bars and the plate 1.

The construction illustrated and described herein provides a simple and efficient bumper of the type having a widened central impact portion; and one which can be conveniently and quickly assembled and disassembled and one which is adapted to withstand the ordinary incidents of use.

Having thus described my invention, what I claim is:

1. A bumper comprising a rear or auxiliary section having a bar provided with ends bent forwardly toward and spaced from each other and with a forwardly projected central portion, and an impact section comprising symmetrical external upper and lower bars each having a central portion extending substantially parallel with and vertically spaced from the auxiliary bar and projecting respectively above and below such bar, each of the impact bars having ends directed toward the ends of the other impact bar, and intermediate upper and lower impact bars interposed between the first mentioned bars and located respectively above and below the auxiliary bar and each having a central portion spaced from and extending substantially parallel with the central portion of its adjacent external bar and each having also end portions that are presented toward the end portions of the opposed intermediate bar, the end portions of the intermediate bars being substantially parallel with the end portions of their respective adjacent external bars, means connecting the ends of the impact bars to the ends of the auxiliary bar, and means connecting the central portions of the said bars.

2. A bumper comprising a pair of attaching members, an impact section comprising symmetrical external upper and lower bars each having a portion projected above and below said members, respectively, and intermediate upper and lower bars interposed between the first mentioned bars and each having a portion projected above and below the said members, respectively, said impact bars being substantially square in section, and means connecting the ends of said bars to said members.

3. A bumper comprising a pair of attaching members, and a central impact section extending between said members, said impact section comprising external upper and lower bars each having ends projected toward the ends of the other bar and intermediate upper and lower bars each having end portions projecting toward the end portions of the other intermediate bar and each having contacting end portions beyond the first mentioned end portions and diverging end portions beyond the last mentioned end portions, and means for securing the ends of the impact section to the said members, said means comprising a clamping plate having seats adapted to receive and interlock with the ends of the impact bars cooperating therewith, a cooperating clamping plate, and bolts connecting said plates.

4. A bumper comprising a pair of attaching members, an impact section extending between said members and comprising an upper and a lower external impact bar each having ends projected toward the ends of the other, with the extreme end portions further deflected toward each other, intermediate upper and lower impact bars interposed between the first mentioned impact bars and each having end portions projecting toward the end portions of the other intermediate bar, the extreme end portions of one of such intermediate bars diverging from the like end portion of the other bar, a clamping plate for each end of the impact section and each having seats adapted to engage the upper and lower surfaces of the end portions of the impact bars, a cooperating clamping plate adapted to be secured to each of the first mentioned plates, and bolts connecting the said plates, one of such bolts having a squared portion the adjacent surfaces of which are adapted to engage the inner surfaces of the end portions of the external bars and another of said bolts having a squared portion, the adjacent surfaces of which are adapted to engage the adjacent inner surfaces of the extreme end portions of the intermediate bars.

5. A bumper comprising a pair of attaching members, an impact section extending between said members and comprising an upper and a lower external impact bar each having ends projected toward the ends of the other, intermediate upper and lower impact bars interposed between the first mentioned impact bars and each having end portions projecting toward the end portions of the other intermediate bar, said intermediate bars contacting beyond such end portions and having extreme end portions diverging from each other, a clamping plate for each end of the impact section and each having seats adapted to engage the upper and lower surfaces of the extreme end portions of the impact bars and like surfaces of the contacting portions of the intermediate bars, a cooperating clamping plate adapted to be secured to each of the first mentioned plates, and one or more bolts connecting the said plates, one of such bolts having a squared portion the adjacent surfaces of which are adapted to engage the inner surfaces of the divergent end portions of the intermediate bars.

6. A bumper comprising a pair of attaching members, an impact section extending between said members, said section comprising external upper and lower bars each having ends presented toward the ends of the other bar, intermediate upper and lower bars interposed between the external bars and each having end portions adapted to contact with corresponding end portions of the other bar, the extreme end portions of such intermediate bars diverging from each other, and means for securing the ends of said bars to said attaching members, said means comprising a clamping plate for each end of the impact section, each clamping plate having seats for the end portions and for the contacting portions of the said bars, a cover plate cooperating with each clamping plate, and bolts for securing the said clamping plates to the said members, the said bolts cooperating with the ends of the upper and lower external members and with the diverging ends of the intermediate members to hold such ends anchored against their seats.

7. A bumper comprising a pair of attaching members, an impact section extending between said members, said section comprising external upper and lower bars each having ends presented toward the ends of the other bar, intermediate upper and lower bars interposed between the external bars and each having an extreme end portion adjacent to and diverging from the like portion of the other bar, and means for securing the ends of said bars to said attaching members, said means comprising a clamping plate for each end of the impact section, each clamping plate having seats for the end portions of the said bars, a cover plate cooperating with each clamping plate, and one or more bolts for securing the said clamping plates to the said members, one of such bolts being interposed between and cooperating with the diverging ends of the intermediate members to hold such ends anchored against their seats.

In testimony whereof, I hereunto affix my signature.

CHRISTIAN GIRL.